Jan. 3, 1967 T. J. DIETZ 3,296,345
METHOD OF MAKING MOLDED CONTAINERS
Filed Oct. 29, 1963

United States Patent Office 3,296,345
Patented Jan. 3, 1967

3,296,345
METHOD OF MAKING MOLDED CONTAINERS
Thomas J. Dietz, Chester Heights, Pa., assignor to FMC Corporation, Philadelphia, Pa., a corporation of Delaware
Filed Oct. 29, 1963, Ser. No. 319,720
7 Claims. (Cl. 264—98)

This invention relates to an improved method for attaching preformed elements or fixtures to containers during the formation thereof.

It is conventional in the art to form containers and other hollow articles by expanding a gob or closed tube of expandable plastic material within a desirably shaped mold. As a separate operation, containers formed in this manner are often provided with preformed elements or fixtures, such as spouts or caps, as by means of adhesives, separate fasteners, etc. The mode of attaching these preformed elements, however, usually demands greater care and accuracy during the molding operation, entails added operations and material costs, and may often involve some sacrifice in the structural integrity of the container itself. Accordingly, a primary object of this invention is to provide for a generally new or improved and more satisfactory method for forming molded containers.

Another object is the provision of an improved method for attaching preformed elements or fixtures to molded containers during the formation thereof.

Still another object is the provision of a method for mechanically interlocking preformed discharge means or closures to plastic containers during the molding thereof.

A still further object is the provision of an improved method in which a plastic container is molded, and while remaining in the molding apparatus, is filled with a flowable material which is to be packaged and sealed.

Still further objects will appear from the following description.

The above objects are accomplished in accordance with the present invention by a method which involves engaging a tubular mass of flowable or plastic film-forming material with a preformed element or fixture, expanding the tubular mass of film-forming material against the internal walls of a surrounding mold, and thereafter causing the expanded film-forming material to set and provide a hollow article or container. The preformed element or fixture which is employed must be shaped with undercut or re-entrant portions into which the film-forming material flows and with which it subsequently interlocks when it is set. At the start of the method, the preformed element or fixture is positioned close to an annular extrusion means so that the film-forming material which is first supplied flows into the undercut portions thereof. This preformed element or fixture is then moved away from the extrusion means concomitantly with the continued delivery of the flowable film-forming material so that a tubular mass thereof is provided within the surrounding mold.

The mass of plastic film-forming material which is initially delivered into the mold cavity may include an amount necessary for forming the entire container. Alternatively, this initial mass may be supplemented with additional film-forming material supplied continuously and concomitantly with the expansion thereof into a container form.

Expansion of the plastic film-forming material may be achieved by means of air or other gas which is non-reactive with the particular film-forming material employed, or by means of a vacuum applied through the walls of the mold or by a flowable material which is being packaged or by a combination of these procedures. If desired, the expanding or inflating medium may be in a heated condition when delivered into the gob of film-forming material to prevent premature setting thereof.

In addition to means for extruding an annular mass of flowable film-forming material, the apparatus employed in the method of the present invention includes a pillar for moving the preformed element toward and away from the extrusion means, mold sections cooperating with the pillar to provide a mold cavity of desired configuration, means for expanding the tubular mass of film-forming material, and means for sealing and severing the same from the extrusion means. The apparatus may also include means for filling the resulting hollow article or container with a flowable material which is to be packaged while the container remains in the mold cavity, as more fully described hereafter.

In the resulting container the preformed element or fixture forms part of the container walls or body which is itself of seamless and unitary construction. Preferably, the preformed element and container body are mechanically interlocked so that these parts may be readily separated from each other yet are connected together by a fluid-tight joint. The containers molded by the method of the present invention may be filled with a flowable material and sealed while still remaining in the mold or, alternatively, they may be released and stored or filled in a separate and independent operation.

The preformed elements or fixtures which are attached to the containers may be formed of metal, plastics or any other suitable materials which are capable of withstanding the conditions employed during the molding operation. Except for the presence of undercut or re-entrant portions, as heretofore mentioned, the particular shape, structure and function of the preformed element or fixture is not critical for satisfactory practice of the present invention. For example, such preformed elements or fixtures may consist of pouring spouts, caps or closures, advertising materials, container handles; etc.

The container of the present invention may be made from a wide variety of materials which may be rendered plastic or in a flowable condition. Preferred types include the synthetic linear polymers of thermoplastic character and the elastomeric types. Examples include vinyl resins, such as polyvinyl acetate, copolymers of vinyl chloride and vinyl acetate, copolymers of acrylonitrile and vinyl acetate, polyacrylonitrile and copolymers of acrylonitrile with vinyl chloride, vinyl acetate, methacrylonitrile, and so forth, polyethylene, linear superpolymers of the polyester of nylon (polyamide) type, polyvinyl butyral, polyvinyl alcohols, polyvinyl ethers; elastomeric types may include neoprene, polymers of chloroprene, copolymers of butadiene with styrene or acrylonitrile, polyisobutylene, and so forth. It is to be understood that the mentioning of these particular materials is not intended to limit the invention thereto but merely to illustrate the wide variety of film-forming materials that can be used in carrying out the invention. Of course, the selection of any particular material depends upon the character of the material which is to be packaged in the finished container. Thus, polyvinyl acetate, polyvinyl acetals and polyvinyl alcohols and neoprene, especially the latter two types, are highly advantageous when packaging oils, especially of the hydrocarbon type. Polyvinyl acetate, polyvinyl chloride, related copolymers of these two monomers, and polyethylene are, on the other hand, particularly adapted for packaging of aqueous liquids.

The film-forming material may be converted into a flowable mass or gob by fusion or by the incorporation of plasticizers or solvents capable of dissolving or dispersing the material. Thus, any of the thermoplastic materials may be heated to fusion after which the expanding or inflating medium may be introduced into a tubular mass thereof, preferably at the same temperature as the fused material. If necessary, the temperature of fusion may be lowered by the incorporation of a plasticizer either of solid or liquid character. When plasticizers or solvents are incorporated into the plastic material to form the gob, the plasticizer or solvent is preferably non-reactive with the expanding medium. The cooling of the fused plastic mass, with or without plasticizers, is effected as the expanded envelope strikes the walls of the mold where it is set into a desired shape. Volatile solvents may be employed for dissolving or dispersing the film-forming material so that the gob may be formed at room temperature and expanded, with the setting or coagulation of the expanded envelope occurring by volatization of the solvent after expansion thereof against the mold walls. Known solvents and plasticizers may be employed, the selection depending upon the particular film-forming material to be used. Thus, acetone or dioxane may be used for vinyl acetate or copolymers of vinyl acetate or vinyl chloride or acrylonitrile. The concentration of the film-forming material, when a solution thereof is used, is preferably as great as possible and is limited only by the necessity that the plastic mass be capable of expanding under the pressure of the expanding medium, yet be of a reasonably viscous coherent plastic character which is capable of supporting its own weight.

In the drawing, FIGURE 1 is a vertical section taken through the molding apparatus employed in the method of the present invention and illustrating the positions assumed by the various parts thereof at the start of molding operations;

Figure 1:
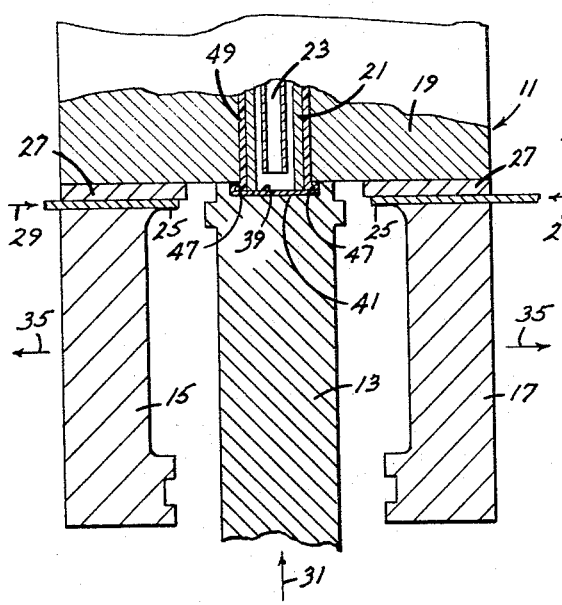

Referring to FIGURE 1 of the drawing, the apparatus employed in the method of the present invention includes an extruder or die 11, a pillar 13 and cooperating mold sections 15 and 17. The extruder 11 is of known construction and includes a pair of spaced concentric die members 19 and 21. The die member 19 is connected to a supply of flowable or plastic film-forming material, while the member 21 is similarly connected to a suitable pump or pressurized tank for delivering an expanding or inflating medium, such as air, in accordance with a predetermined flow pattern. Telescoped within the die member 21 is a filling tube 23 which is connected to a supply of flowable material which is to be packaged. The tube 23 is preferably suported by suitable reciprocating means, such as a rack and pinion, not shown, so as to permit the tube 23 to be moved relative to the extruder. In addition, a pair of blades 25 are slidably supported by guides 27 for reciprocating movement across the end of the die member 19, as indicated by arrows 29.

The pillar 13 is adapted to be reciprocated toward and away from the extruder 11, as indicated by arrows 31 and 33. Similarly, the mold sections 15 and 17 are mounted by suitable means, not shown, for lateral movement toward and away from each other as indicated by arrows 35 and, together with the pillar 13, provide a cavity 37 of desired configuration. The pillar 13 includes a recess 39 for receiving a preformed element or fixture, such as a container closure shown at 41, and an annular projection 43 which is adapted to seat within correspondingly shaped recesses 45 formed in the mold sections 15 and 17.

In practicing the method of the present invention with the above described apparatus, a closure 41 or other preformed element or fixture is first positioned within the recess 39 of the pillar 13 with its undercut or re-entrant portions 47 being exposed. The pillar 13 is then elevated into contact with the extruder 11, as shown in FIGURE 1, after which plastic or flowable film-forming material, indicated at 49, is supplied through the die member 19. The film-forming material which is first delivered engages with the inside surface of the closure and then flows radially outward and into the undercut portions thereof. If necessary, the internal surface of the closure 41 may be pretreated with a suitable material, such as a silicone, to prevent adhesion of the film-forming material which engages therewith.

Figure 2:
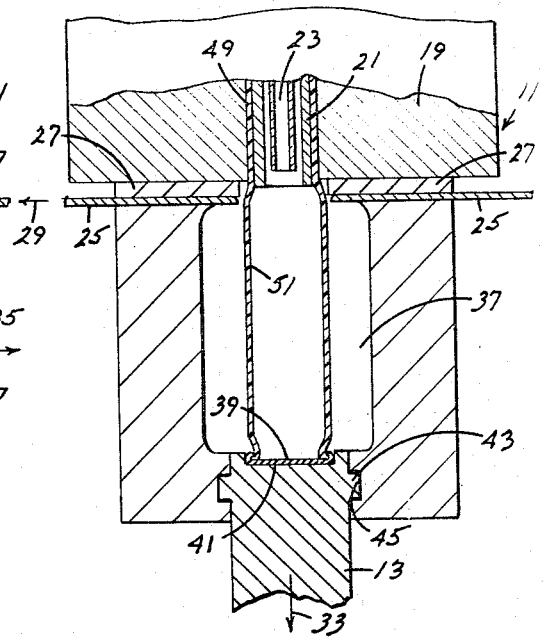
FIGURE 2 is a view similar to that of FIGURE 1 illustrating the positions of the parts of the apparatus during an intermediate stage of the method of the present invention.

Concomitantly with continuous extrusion of the flowable film-forming material, the pillar 13 is moved to its lowermost position and locked in place by the mold sections 15 and 17, as shown in FIGURE 2. The tubular mass 51 of film-forming material wihch is located with the mold cavity 37 is then expanded against the internal walls of the mold sections, as by air delivered through the die member 21.

Figure 3:
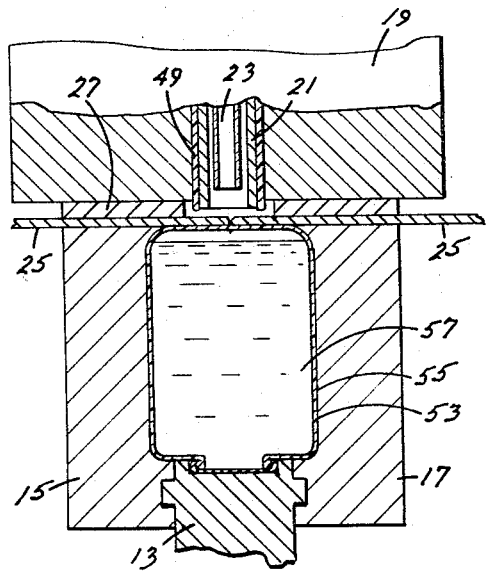
FIGURE 3 is a view similar to FIGURE 2 showing the parts of the apparatus during a final stage of the method of the present invention.

The expanded film-forming material may be then set, as by circulating chilled fluids through or against the mold sections to form a container body 53. While the film-forming material of the container body is still in a flowable or plastic condition, the blades 25 are urged toward each other to thereby complete the formation of a container 55, which is shown in inverted postion in FIGURE 3. The blades 25 may be heated to encourage flow of the film-forming material during container closing and, if desired, the container may be filled with a flowable material 57 which is to be packaged, as by means of the tube 23, prior to the final sealing operation.

It will be noted that as the blades 25 move across the die member 19 to seal the finished container 55, the film-forming material which has been extruded is cleanly severed from that remaining in the die member 19. As a result, the film-forming material which is subsequently extruded will issue from the die part 19 as an annular or open-ended tube. The filled and inverted container 55 may be ejected from the apparatus merely by moving the mold sections 15 and 17 away from each other.

As heretofore mentioned, during the above described method the tubular mass of film-forming material which is initially delivered into the mold cavity may include the amount necessary for completing the formation of the entire container 55. Alternatively, the initially supplied mass of film-forming material may be just sufficient to start the formation of such container and may be continuously replenished concomitantly with the expansion theerof to thereby provide a container having a desired wall thickness. Further, in lieu of inflating such mass of film-forming material with air, expansion may be achieved by the flowable material which is intended to be packaged, or by a combination of such expanding mediums.

Figure 4:
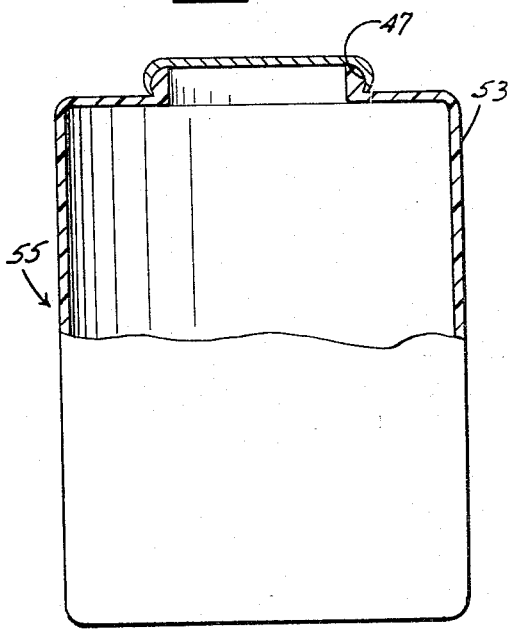
FIGURE 4 is a side view of a container formed in accordance with the present invention, with a portion thereof shown in section.

In the finished container 55, as shown in FIGURE 4, the undercut or re-entrant portions of preformed closure 41 are securely interlocked with the container body to provide for fluid-tight seal. The preformed closure can be repeatedly removed by and reapplied to the container body, in the same manner as conventional snap-type covers, without any significant sacrifice in the strength and seal of the joint provided between the closure or container body.

It will be understood, of course, that the method of the present invention may be employed for attaching a variety of different preformed elements or fixtures to containers during the molding thereof, including threaded closures, stoppers, spouts, retainers for baby feeding nipples or other discharge means or even another preformed container.

It is to be understood that changes and variations may be made without departing from the spirit and scope of the invention as defined in the appended claims.

I claim:

1. A method of forming hollow articles of organic film-forming material including the steps of delivering an open end of a tubular mass of flowable film-forming material against a preformed element having undercut portions so that the film-forming material along the edge of the open end of the delivered tubular mass flows into the undercut portions of the preformed element and interlocks therewith, expanding the tubular mass of film-forming material against the walls of a surrounding mold, causing the film-forming material which is within the undercut portions of the preformed element and the expanded film-forming material to set and severing the expanded film-forming material from its source of supply.

2. A method of forming hollow articles of organic film-forming material including the steps of positioning a preformed element having undercut portions adjacent to an extrusion die, extruding an annular mass of flowable film-forming material from the die and against the preformed element whereby the film-forming material flows into the undercut portions thereof, moving the preformed element away from the die while concomitantly extruding a tubular mass of film-forming material therefrom, expanding the tubular mass of film-forming material against the walls of a surrounding mold, causing the film-forming material which is within the undercut portions of the preformed element and the expanded film-forming material to set, and severing the expanded film-forming material from the die.

3. A method as defined in claim 2 further including the steps of filling the expanded film-forming material with a flowable material which is to be packaged and sealing the same.

4. A method as defined in claim 2 wherein the tubular mass of film-forming material is expanded by a flowable material which is to be packaged and is sealed while being severed from its supply source.

5. A method as defined in claim 2 wherein the tubular mass of flowable film-forming material is expanded by a gas under pressure.

6. A method as defined in claim 2 wherein the flowable film-forming material is an organic thermoplastic material.

7. A method of forming hollow articles of organic film-forming, thermoplastic material including the steps of positioning a preformed element having undercut portions adjacent to an extrusion die, extruding an annular mass of molten film-forming material from the die and against the preformed element whereby the molten film-forming material flows into the undercut portions thereof, moving the preformed element away from the die while concomitantly extruding a tubular mass of molten film-forming material therefrom, inflating the tubular mass of film-forming material against the walls of a surrounding mold, cooling the film-forming material which is within the undercut portions of the preformed element and the expanded film-forming material, and severing the expanded film-forming material from the die.

References Cited by the Examiner

UNITED STATES PATENTS 2,349,177    5/1944    Kopitke _____ 264—98 X
3,140,329    7/1964    Nutting _____ 264—279 X

FOREIGN PATENTS 628,760    3/1963    Belgium.

ROBERT F. WHITE, *Primary Examiner.*

A. R. NOE, *Assistant Examiner.*